Figure 1:
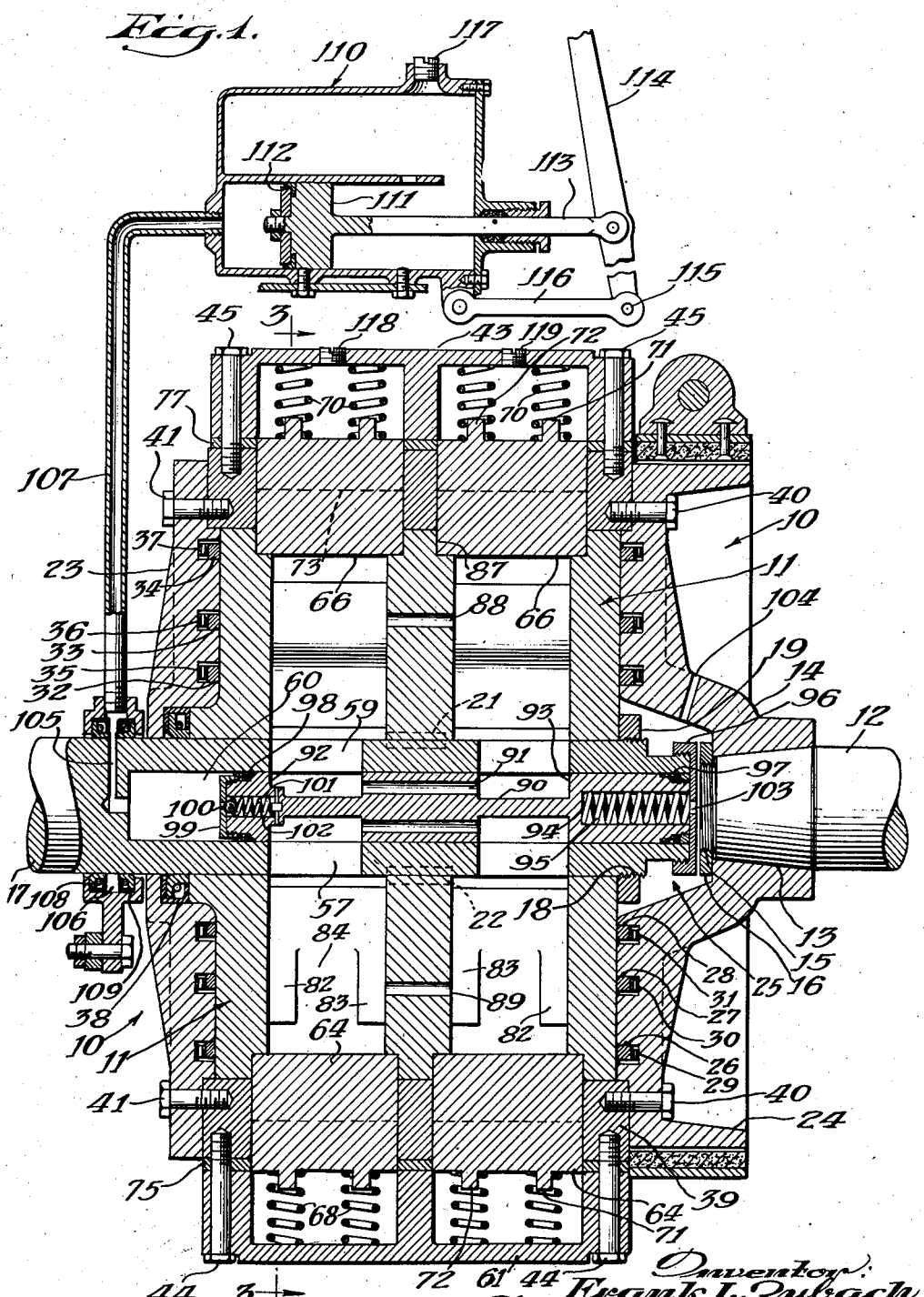

Aug. 15, 1944.    F. L. ZYBACH    2,355,773
HYDRAULIC CLUTCH
Filed June 25, 1941    3 Sheets-Sheet 1

Inventor:
Frank L. Zybach
By Dawson, Ooms & Booth
Attorneys.

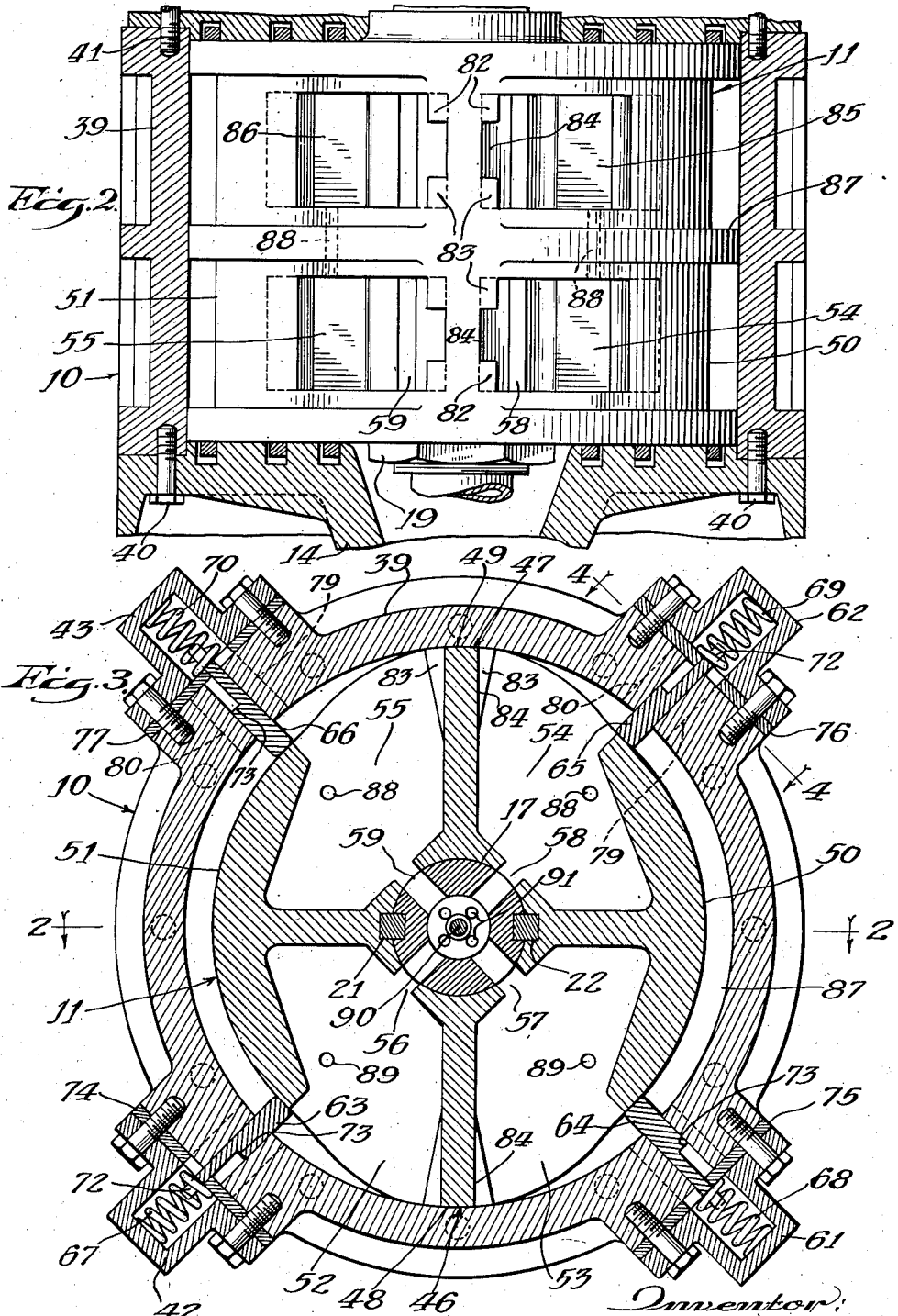

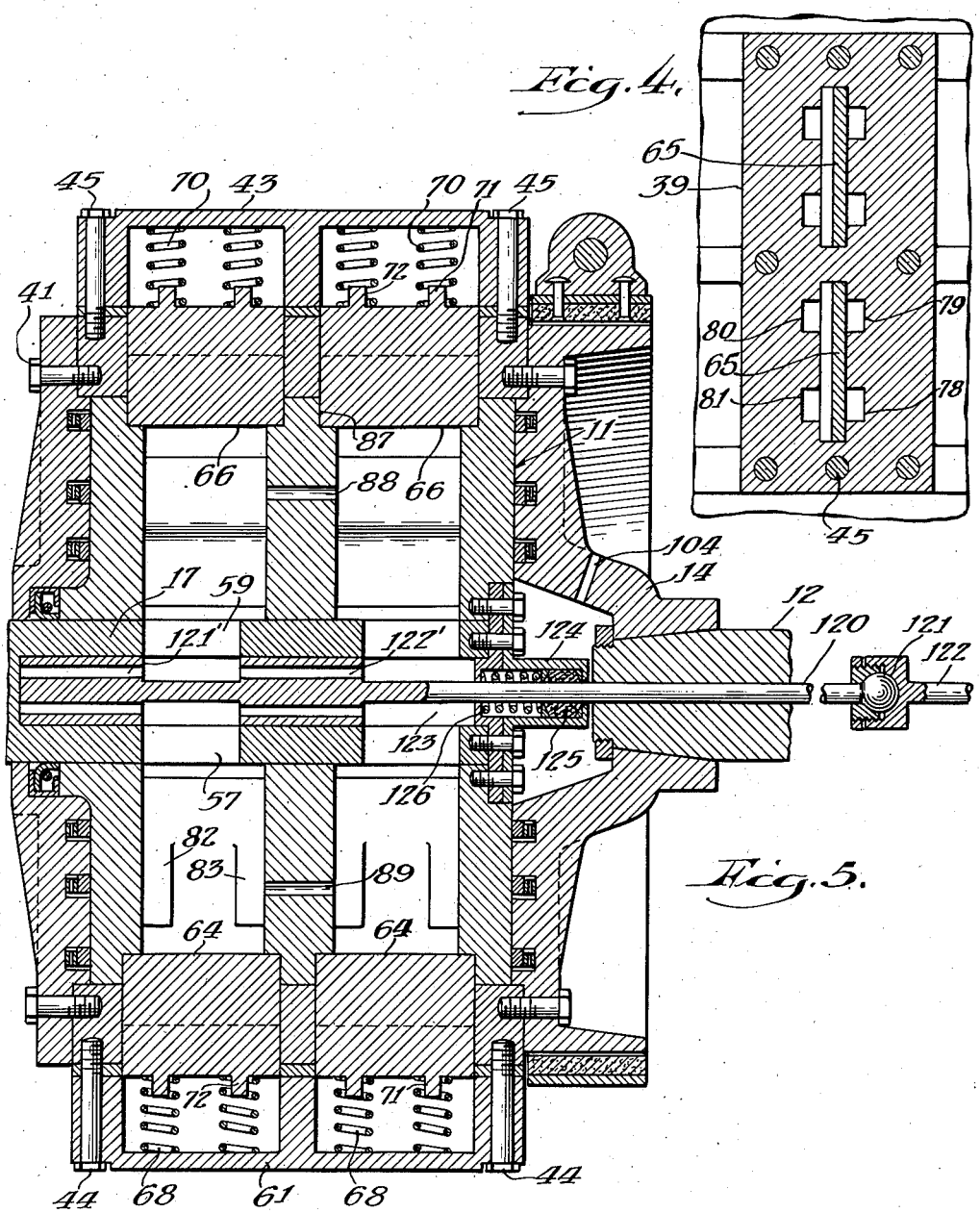

Patented Aug. 15, 1944

2,355,773

UNITED STATES PATENT OFFICE 2,355,773

HYDRAULIC CLUTCH

Frank L. Zybach, Columbus, Nebr.

Application June 25, 1941, Serial No. 399,632

7 Claims. (Cl. 192—59)

This invention relates to a hydraulic clutch and more particularly to a mechanism wherein a pair of movable members are brought into operative engagement through fluid disposed between the members and the engagement and disengagement of the members is provided for by controlling the flow of fluid between them.

An object of the invention is to provide an apparatus in which a pair of shafts are releasably arranged in operative engagement with each other by contact with fluid disposed therebetween. Another object of the invention is to provide a pair of members at least one of which is rotatable with respect to the other, the rotation of the members being controlled by the flow of fluid between them. Still another object is to provide a mechanism in which a pair of rotatable members may be rotated in either direction with respect to each other and the movement of the members with respect to each other prevented by controlling the flow of fluid between them.

Another object of the invention is to provide a hydraulic clutch mechanism wherein a pair of members are disposed one within the other and are spaced apart from each other with the space between the members being divided into a plurality of fluid-tight chambers. The construction includes a cam surface on one of the members which is brought into fluid-tight engagement with the other member and also means carried by one of the members for frictionally engaging the surface of the other member. It is also an object of the invention to provide a hydraulic clutch which can be operated in either direction with equal efficiency and simplicity and to provide a simple and compact clutch unit which is positive in its efficiency and speedy and effortless in control.

Other features and advantages will appear from the following specification and drawings, in which—

Figure 1 is a vertical sectional view of the clutch mechanism; Fig. 2 is a horizontal sectional view partly in plan showing the relation of the rotatable members with respect to each other, the view being taken along the line 2—2 of Fig. 3; Fig. 3 is a transverse vertical sectional view taken along the line 3—3 of Fig. 1; Fig. 4 is a fragmentary detail transverse sectional view taken along the line 4—4 of Fig. 3; and Fig. 5 is a vertical sectional view of a modified form of the invention showing a modification of the control apparatus.

In the embodiment of the invention described herein, the clutch includes a casing member 10 and a rotor member 11 disposed within the casing. The casing member 10 may be of any suitable size, shape or construction and is preferably substantially in the form of a cylinder equipped with closed ends which form the sides of the casing member. The casing member is hollow and receives within it the rotor 11 which is of substantially the same cylindrical shape as will be described more fully herein.

The casing member 10 receives shaft 12 within an opening in one of the side walls of the casing. The shaft 12 may be provided with a reduced beveled end 13 which engages the opening in the side wall 14 of the casing 10. The end of the shaft is equipped with threads 15 which receive a locknut 16 for securing the shaft in position in the casing.

The rotor 11, on the other hand, is secured to a shaft 17 which extends into the central portion of the rotor. The shaft 17 is equipped with threads 18 on the end thereof which extends from the central portion of the rotor and a lock-nut 19 holds the rotor in position on the shaft. The keys 21 and 22 prevent rotation of the rotor with respect to the shaft.

The casing 10 is equipped with side or end walls 14 and 23. The wall 14 receives the shaft 12 which may, if desired, be keyed to the wall to prevent rotational movement of the casing with respect to the shaft. If desired, a suitable annular flange 24 may be provided on the wall 14 to serve as a mounting for a suitable brake mechanism (not shown) which may be attached to the clutch. The wall 14 is recessed at 25 in order to permit the shaft 17 to extend through the rotor 11 without engaging the casing 10. Along the inside surface of the wall 14 and engaging the adjacent side of the rotor 11 are the annular oil seal rings 26, 27 and 28. Each of these rings is received within an appropriate annular groove of the wall 14 of the casing 10 and tightly engages the inner side or wall of the groove. Springs 29, 30 and 31 may be provided to continuously urge the oil seal rings into engagement with the rotor 11.

The side wall 23 of the casing 10 is provided with oil seal rings 32, 33 and 34 which engage the opposite side of the rotor 11. Springs 35, 36 and 37 are provided for the oil seal rings 32, 33 and 34 respectively. A suitable annular oil seal ring 38 is also provided to accomplish a fluid-tight engagement between the shaft 17 and the wall 23.

The walls 14 and 23 may be secured to the outer peripheral wall 39 of the casing 10 by a plurality of bolts 40 and 41 or by any other suitable means. The peripheral wall 39 of the casing 10 serves as a mounting for housings 42 and 43 which are secured to the casing by bolts 44 or 45 or other suitable means.

As seen particularly in Figures 2 and 3, the rotor 11 is substantially cylindrical in shape and is provided with a pair of cam surfaces 46 and 47 which engage the inner surface of the periphery wall 39 of the casing 10 at the high points 48 and 49 thereof. Between the cam portions 46 and 47 are peripheral portions 50 and 51 which are spaced away from the inner peripheral surface of the casing 10 and are preferably in cross section of the contour of a true circle. The rotor 11 is preferably provided with a plurality of ports 52, 53, 54 and 55 which are disposed immediately adjacent the high points 48 and 49 of the cam surfaces 46 and 47 on opposite sides thereof. Each of the ports communicates with the space between the casing 10 and the rotor 11 where these members are spaced apart. The high points of the cam portions on the periphery of the rotor however, frictionally engage the casing in fluid-tight engagement therewith and divide the space between the rotor and the casing into the fluid-tight chambers. The ports 52, 53, 54 and 55 communicate through passages 56, 57, 58 and 59 respectively with the central portion of the shaft 17 which is hollow in the center and forms a tubular opening 60 which permits all of the passages to be brought into intercommunication. Thus the space between the rotor 11 and the casing 10 is divided into fluid-tight chambers by the high points 48 and 49 on the cam portions of the rotor and the fluid-tight chambers are brought into intercommunication with each other through the various ports and passages in the rotor.

About the casing 10 are the outwardly extending housings 42, 43, 61 and 62 which are secured to the casing by bolts or other suitable means. The portion of the casing immediately beneath each of the housings is apertured to slidably receive the vanes 63, 64, 65 and 66. The inner surface of each of the vanes is in frictional engagement with the peripheral surface of the rotor 11 and is maintained in such engagement by the urging of the springs 67, 68, 69 and 70. Each of the vanes as seen particularly in Fig. 1 is equipped with a pair of outwardly extending projections 71 and 72 which are received within the springs and serve to maintain the springs in proper alignment with the vanes.

Referring again to Fig. 3, each of the vanes is provided with a lateral flange 73 formed by a cut away portion in the outer end of the vane. Plates 74, 75, 76 and 77 extend across the outer surface of the casing 10 beneath the housings 42, 61, 62 and 43 respectively. Each of the plates is apertured to permit the passage of the vanes therethrough and engages the cut away portion of each of the vanes beyond the lateral flange 73, the engagement with this side of the vane being a tight fit which prevents the flow of fluid beyond the plate. On the other side of the vane the plates are cut away to permit the flow of fluid between the plate and the vane so that the fluid may pass from the space between the rotor and the casing member to the outer ends of the vanes.

Referring particularly to Fig. 4, the casing 10 beneath each of the housings 42, 61, 62 and 43 is equipped with ports 78, 79, 80 and 81 which extend from the inner periphery of the casing 10 to the inner portion of each of the housings. The ports are spaced from each other and are preferably disposed on opposite sides of the vanes. The ports 78 and 79 communicate with the space between the rotor and the casing at one end and with the portion of the housings beyond the outer end of the vane at the other end. The ports 80 and 81, on the other hand, are intercepted by the plates 74, 75, 76 and 77 and serve to introduce fluid above the flange 73 in each of the vanes but not to the portion of the housing beyond the end of the vane.

Referring particularly to Fig. 2, each of the ports 52, 53, 54, and 55 in the rotor 11 is equipped with inwardly extending projections 82 and 83 on the side of the port adjacent the high point of the cam portion of the periphery of the rotor. These projections form an extending recess 84 in each of the ports, the recess 84 being of substantially the same width as the distance between the ports 78 and 79 in the casing 10. The projections 82 and 83 extend into the port a sufficient distance to cover the ports 78 and 79 and cause the ports 52, 53, 54 and 55 to be brought into communication with the ports 78 and 79 at exactly the same time that the vanes 63, 64, 65 and 66 pass from the high point of the cam surface to a position above the ports in the rotor.

The rotor 11 is preferably equipped with a duplicate set of ports and passages so that greater capacity for the device may be obtained without making the ports and passages so large as to weaken the rotor structure. Thus as seen in Fig. 2, the ports 54 and 55 correspond to another pair of ports 85 and 86 immediately adjacent the same. The rotor is provided with a substantially circular peripheral surface 87 in the center thereof between the two sides of the same. The portion 87 being substantially circular in shape extends along the inner surface of the casing 10 and serves to strengthen and support the rotor structure. About the ports 85 and 86 are cam portions and circular peripheral portions spaced from the inner surface of the casing 10. Since this structure corresponds exactly to the structure already described in connection with the ports 52, 53, 54 and 55, it will not be described in detail herein.

If desired, the clutch unit may be equipped with any suitable number of ports and cam portions spaced from each other by partitions similar to the portion 87. As seen particularly in Fig. 1 the ports are brought into communication with the laterally adjacent ports by the passages 88 and 89.

The shaft 17 is provided with a hollow tubular opening 60 which extends across the rotor 11. Within this opening 60 is a shaft 90 carrying a sleeve 91 and enlarged at its ends to form pistons 92 and 93. The piston 93 is equipped with a cut away portion 94 which receives a spring 95, the spring being supported against a closure member 96 on the end of the shaft 17. The shaft 90 is movable within the opening 60 in the shaft 17 and is continuously urged away from the end of the shaft by the spring 95. If desired, packing 97 may be provided on the end of the enlarged portion 93 of the shaft 90 to prevent the leakage of fluid from the rotor.

The enlarged portion 92 of the shaft 90 is snugly fitted within the opening 60 and acts as a piston therein. Packing 98 may also be provided on this piston to bring it into fluid-tight engagement with the walls of the opening 60. The piston 92 is provided with a closure member 99, a ball bearing 100 and a spring 101 in the passage 102, the assembly forming a check valve which permits fluid to be passed through the piston to replenish or add to the supply of fluid in the rotor when the pressure on the end of the piston exceeds a predetermined pressure. The closure member 96 is provided with an opening 103 and the casing 10 with an opening 104 which permits air to flow from the recess 94 in the piston 93 and prevents the piston 93 from becoming air locked in position.

A passage 105 communicates with opening 60 and with an annular well 106. The well 106 is rotatably supported by the shaft 17 and communicates with the fluid inlet 107 which is fixed in position. Annular oil seal rings 108 and 109 provide a fluid-tight engagement with the outer surface of the shaft 17.

The fluid inlet 107 is connected to a suitable hydraulic control cylinder 110 which is equipped with the usual piston 111 and packing 112. The piston 111 is driven by any suitable means and may be connected by a shaft 113 to a lever 114 pivotally mounted at 115 on a standard 116. The hydraulic control cylinder operates in the usual manner to force the fluid through the inlet 107 when the lever 114 is advanced in position and to permit the return of the fluid through the pipe 107 when the lever 114 is returned to its original position. A plug 117 is provided to permit the introduction of fluid into the cylinder 110.

Plugs 118 and 119 in the housing 43 permit the introduction and withdrawal of fluid directly to and from the body of the rotor 11.

In the modification of the invention shown in Fig. 5, manual control is provided for the actuation and operation of the sleeve valve within the central portion of the rotor. A shaft 120 connected through a ball joint 121 to a lever 122 extends into the central portion of the rotor 11 passing through the shaft 12 and the shaft 17. The shaft 120 may be actuated manually or by any suitable power means. The shaft 120 supports the sleeves 121' and 122' which are snugly fitted within the cylindrical opening 123 and the shaft 17. A packing housing 124 is disposed about the shaft 120 at the point of its entrance into the rotor 11. The housing may include packing material 125 of suitable character and a spring 126, the packing assembly being of the usual construction and not being described in detail herein.

Operation

The hydraulic clutch mechanism may be connected to a pair of shafts one of which is power driven and the other of which is to be driven by the operative engagement of the clutch with the first shaft. Either the shaft 17 or the shaft 12 may be power driven. For example, any suitable power means may be connected to the shaft 17 and will cause the shaft and the rotor keyed thereto to rotate.

When the shaft 90 and the sleeve 91 secured thereto are in the position shown in Fig. 1, the clutch is disengaged and the rotor 11 rotates freely within the casing 10.

The space between the rotor 11 and the casing 10 including the various ports and passages in the rotor is filled with a suitable fluid such as oil. As seen particularly in Fig. 3, when the rotor 11 is rotated, the high points 48 and 49 of the cam portions 46 and 47 on the periphery thereof move about the inside of the casing 10 in fluid-tight frictional engagement with the inside surface thereof.

The vanes 63, 64, 65 and 66 are maintained in fluid-tight frictional engagement with the periphery of the rotor 11 and, being mounted in the casing 10, are maintained in fixed position while the rotor is moved.

The rotor may be rotated in either direction. If the rotor is rotated in a clockwise direction for example, the forward movement of the high point 49 of the cam portion 47 on the periphery thereof toward the vane 65 causes the fluid immediately ahead of the same to be forced into the port 54 and through passage 58. In the same way fluid is passed into the port 52 and passage 56. The fluid from the passages 56 and 58 is received within the tubular opening 60 in the center portion of the shaft 17 and flows into the passages 57 and 59 and thence to the ports 53 and 55 filling the space created by the movement of the high points 48 and 49 away from the vanes 54 and 56 respectively.

Since the vanes are slidably mounted in the casing 10, they are permitted to move inwardly and outwardly as they pass over the cam portions on the periphery of the rotor 11. The springs 67, 68, 69, and 70 continuously urge the vanes into engagement with the periphery of the rotor. In addition, the vanes are so arranged that the fluid pressure on the outer ends of the same is equal to the fluid pressure on the inner ends when the vanes are passing over the ports and exceeds the pressure on the inner ends when the vanes are riding on the solid portion of the periphery of the rotor.

The fluid which is disposed between the rotor and the casing passes through ports 78, 79, 80 and 81 adjacent each of the vanes. Thus the fluid which passes through the ports 80 and 81 reaches the flange portion 73 of each of the vanes and exerts a pressure on the same, urging the vane into engagement with the periphery of the rotor. The ports 78 and 79 communicate at one end with the space between the rotor and the casing and at the other end with the inner portion of the vane housings 42, 61, 62 and 43. Fluid which is received within these ports exerts a pressure on the outer ends of the vanes and tends to urge them into engagement with the periphery of the rotor.

When the vanes are in engagement with the solid portions 50 and 51 on the periphery of the rotor, all of the ports 78, 79, 80 and 81 communicate with the fluid between the rotor and the casing. Fluid pressure is thus exerted upon the outer end of the vane which is received within the spring and upon the flange portion 73. The inner end of each of the vanes is preferably slightly rounded but when in engagement with the solid portion of the periphery very little outward pressure can be exerted upon the vane by the fluid in the space between the rotor and the casing.

As the vane passes over one of the ports 52, 53, 54 or 55 in the rotor 11, the inner end of the vane is exposed to the fluid in the port and the vane is subjected to an outward pressure by this fluid. However, the surface area of the inner end of the vane does not exceed the combined surface areas of the outer end of the vane which is received within the spring and the flange 73. Accordingly, the fluid pressure on the opposite ends of the vane is substantially balanced and the urging of the springs causes the vanes to remain in engagement with the periphery of the rotor.

As the vane passes over the high points 48 and 49 of the cam portions 46 and 47 of the rotor 11, the inner surface of the vane approaches the recess 84 formed by the projections 82 and 83 in the port 54. Similar recesses are provided in each of the other ports 53, 52 and 55. At the same time, the ports 80 and 81 adjacent the vane approach the edges of the projections and extend beyond the projections at exactly the same time that the vane passes beyond the edge of the recess 84. In this manner, the pressure on the opposite ends of the vanes is also balanced.

When the clutch is to be brought into engagement, the lever 114 and the shaft 113 and piston 111 connected thereto are withdrawn to permit fluid to flow into the hydraulic cylinder 110. Pressure on the piston 92 on the shaft 90 is released and the spring 95 urges the shaft 90 and the sleeve 91 attached thereto across the rotor and causes the passages 57, 56, 58 and 59 to be closed by the sleeve. The sleeve and the piston 93 which moves therewith thus serve as a valve to prevent and control intercommunication between the ports 52, 53, 54, and 55.

When the sleeve 91 and piston 93 are in position to close the passages, the fluid can no longer flow from one of the ports to another. Accordingly, when the rotor 11 is rotated, the movement of the cam portions 46 and 47 on the periphery thereof force the fluid between the rotor and the casing against the adjacent vane in the casing and causes the casing to rotate with the rotor. The shaft 12 secured to the casing 10 is, of course, rotated and the clutch is in operative engagement.

When it is desired to disengage the clutch the lever 114 is advanced to move the piston 111 forwardly in the cylinder 110. Fluid is forced through the inlet 107 into the opening 60 in the shaft 17 and by exerting pressure on the piston 92 on the shaft 90, causes the shaft 90 to be moved towards the shaft 12 against the urging of the spring 95. As the shaft 90 is moved towards the shaft 12, the sleeve 91 and the piston 93 are moved from intercepting position with respect to the passages 56, 57, 58 and 59 and the ports 52, 53, 54 and 55 again become intercommunicating. As a result of the intercommunication of the ports, fluid may flow freely through the ports and rotation of the casing member immediately ceases.

The additional set of ports 85 and 86 in the rotor do not in any way affect the function of the apparatus except insofar as they provide greater capacity with a maximum of strength.

In the modification of the invention shown in Fig. 5, the shaft 120 is manually moved back and forth within the rotor 11. The sleeves 121' and 122' are moved to and from intercepting position with respect to the ports and act as a valve to control the flow of fluid through the ports. Any suitable means may be provided for operating the shaft 120.

When it is desired to introduce fluid into the clutch mechanism, the plugs 118 and 119 are removed from the upper surface of the housing 43 and the ports 78, 79, 80 and 81 about the adjacent vane are brought into alignment with one of the ports 52, 53, 54 or 55 in the rotor. Fluid may then be introduced through the opening of one of the plugs and air is permitted to escape through the opening of the other plug.

It is also possible to introduce fluid into the mechanism by advancing the lever 114 to a point where the piston 111 in the hydraulic cylinder 110 exerts sufficient pressure to force fluid past the ball bearing 100 in the check valve in the piston 92.

The hydraulic clutch mechanism may be used for any purpose in connection with which it is desired to bring two shafts into releasable operative engagement. The mechanism is particularly suited for apparatus wherein it is desired to obtain positive efficient operation and where rotation of the members of the clutch in either direction may be desired.

The clutch mechanism may be equipped with a rotor having any desired number of cams. As shown, the rotor has two cams disposed on opposite sides of the same. One cam alone may be used or a plurality of cams may be provided. However, it is preferable to arrange the cams in pairs so that in operation they exert a balancing effect upon each other. The vanes or other means which are used for frictionally engaging the periphery of the rotor to form fluid-tight chambers in the space between the casing and the rotor may also be arranged in any suitable size, shape or number. It is important, however, that a construction be provided which serves to divide the space between the rotor and the casing member into a plurality of fluid-tight chambers.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

I claim:

1. A hydraulic clutch comprising, a casing member, a cam rotor member supported within the casing member with the cam portion of the periphery of the rotor in fluid-tight engagement with the casing member, the other portions of the periphery being spaced away from the casing member, at least one of said members being rotatable with respect to the other, means for rotating one of the members, a plurality of vanes carried by the casing in frictional engagement with the periphery of the rotor, said vanes dividing the space between the members into a plurality of fluid-tight chambers, said casing being provided with a passage communicating with one of said chambers and the outer end of one of said vanes whereby the fluid pressure within the passage is exerted on the outer end of the vane, a passage for bringing said chambers into communication with each other, and valve means for opening and closing said passage.

2. A hydraulic clutch comprising, a cylindrical casing, a cam rotor rotatably supported within said casing with the periphery of the rotor at the portion of the greatest radius thereof being in fluid-tight frictional engagement with the inner surface of the casing, the other portions of the periphery of the rotor being spaced away from the inner surface of the casing, a pair of vanes slidably received in opposite sides of said casing and being in engagement with the periphery of said rotor, said casing being provided with at least one passage adjacent each of said vanes, each passage being in communication with the outer end of the adjacent vane and with the chamber adjacent the same whereby the fluid pressure in the chamber is exerted on the outer end of the vane, means for continuously urging said vanes into fluid-tight frictional engagement with the periphery of the rotor to divide the space between the rotor and the casing into fluid-tight chambers, a plurality of ports in said rotor, each of said ports communicating with one of said chambers, a passage for bringing said ports into communication with each other, and valve means for opening and closing said passage.

3. A hydraulic clutch comprising, a cylindrical casing, a rotor rotatably supported within said casing, said rotor being equipped with cam portions extending into fluid-tight frictional engagement with the inner surface of the casing, the other portions of the periphery of the rotor being circular in shape and being spaced away from the inner surface of the casing, a plurality of vanes slidably received in opposite sides of the casing, spring means for continuously urging said vanes into frictional engagement with the periphery of the rotor, additional means for urging the vanes into fluid-tight engagement with the periphery of the rotor as the vanes pass along the circular portion thereof, a plurality of ports in the cam portions of said rotor, each of the ports communicating with one of said chambers, passages for bringing said ports into intercommunication, and valve means for opening and closing said passages.

4. A hydraulic clutch comprising, a casing, a cam rotor rotatably supported within the casing with the periphery of the rotor at the portion of the greatest radius thereof being in fluid-tight frictional engagement with the inner surface of the casing, the other portions of the periphery of the rotor being spaced away from the inner surface of the casing, a plurality of vanes slidably received within said casing and extending into engagement with the periphery of the rotor, means for continuously urging said vanes into frictional engagement with the periphery of the rotor to divide the space between the rotor and the casing into fluid-tight chambers, said casing being provided with at least one passage adjacent each of said vanes, each passage being in communication with the outer end of the adjacent vane and with the chamber adjacent the same whereby the fluid pressure in the chamber is exerted on the outer end of the vane, a plurality of ports in said rotor opening on the periphery thereof, each of said ports being in communication with one of said chambers, means for bringing said ports into communication with each other, and releasable means for preventing such intercommunication.

5. A hydraulic clutch comprising, a casing, a cam rotor rotatably supported within the casing with the periphery of the rotor at the point of the greatest radius thereof being in fluid-tight frictional engagement with the inner surface of the casing, the other portions of the periphery of the rotor being spaced away from the inner surface of the casing, a plurality of vanes slidably received within the casing and extending into engagement with the periphery of the rotor, means for continuously urging said vanes into frictional engagement with the periphery of the rotor to form a plurality of fluid-tight chambers, said casing being provided with a pair of passages disposed on opposite sides of each of said vanes in adjacent relation thereto, each passage being in communication at one end with a chamber adjacent the vane and at the other end with the outer end of the vane whereby the fluid pressure of the chamber is exerted on the outer end of the vane and the vane is urged into engagement with the periphery of the rotor, a plurality of ports in said rotor, each of said ports communicating with one of said chambers, a passage for bringing said ports into communication with each other, sleeve valve means for opening and closing said passage, and hydraulic means for controlling the operation of said sleeve valve means.

6. A hydraulic clutch comprising, a casing, a cam rotor rotatably supported within the casing with the periphery of the rotor at the point of the greatest radius thereof being in fluid-tight frictional engagement with the inner surface of the casing, the other portions of the periphery of the rotor being spaced away from the inner surface of the casing, a plurality of vanes slidably received within the casing and extending into engagement with the periphery of the rotor, means for continuously urging said vanes into frictional engagement with the periphery of the rotor to form a plurality of fluid-tight chambers, said casing being provided with a pair of passages disposed on opposite sides of each of said vanes in adjacent relation thereto, each passage being in communication at one end with a chamber adjacent the vane and at the other end with the outer end of the vane whereby the fluid pressure of the chamber is exerted on the outer end of the vane and the vane is urged into engagement with the periphery of the rotor, a central opening extending transversely through the rotor, a plurality of ports in said rotor, each of the ports communicating with one of said chambers at one end and with the central opening in the rotor at the other end, the ports being arranged about the periphery of the rotor at spaced intervals, a movable sleeve arranged in said central opening, said sleeve being so constructed and arranged as to prevent communication of the ports with said opening when the sleeve is in one position and to permit such communication when the sleeve is in another position, and hydraulic means for moving said sleeve from one position to the other.

7. A hydraulic clutch comprising a casing member, a rotatable cam member supported in said casing with the periphery of said member at the point of the greatest radius thereof being in engagement with the inner surface of the casing, the other portions of the periphery of the member being spaced away from the casing, the space between the members being substantially filled with fluid, a pair of vanes received within recesses in the casing and having their inner ends in fluid-tight engagement with the periphery of the rotor to divide the space between the casing and the rotor into fluid-tight chambers, said casing being provided with a pair of passages disposed on opposite sides of each of said vanes for bringing the portion of the recess at the outer end of the vane into communication with the fluid-tight chambers adjacent the vanes whereby the fluid pressure in the chambers is exerted on the outer end of the vane, a plurality of ports in said rotor opening on the periphery thereof, each of said ports communicating with one of said chambers, the inner and outer ends of the vanes being of substantially the same area whereby when the vane engages the portion of the periphery of the rotor having a port therein the fluid pressures on the opposite ends of the vane will be substantially equal, spring means for urging said vanes into engagement with the periphery of the rotor, a passage for bringing said ports into communication with each other whereby fluid may flow from one of said chambers to another, and valve means for opening and closing said passage.

FRANK L. ZYBACH.